(12) United States Patent
Merkel et al.

(10) Patent No.: US 9,825,576 B2
(45) Date of Patent: Nov. 21, 2017

(54) DEVICE AND METHOD FOR OPERATING AN ELECTRIC MACHINE

(71) Applicant: Robert Bosch GmbH, Stuttgart (DE)

(72) Inventors: Tino Merkel, Schwieberdingen (DE); Andreas Koenig, Ostfildern (DE); Marc Rudolph, Erligheim (DE); Lingling Xie, Ludwigsburg-Eglosheim (DE); Guenther Plapp, Filderstadt (DE)

(73) Assignee: Robret Bosch GmbH, Stuttgart (DE)

( * ) Notice: Subject to any disclaimer, the term of this patent is extended or adjusted under 35 U.S.C. 154(b) by 0 days.

(21) Appl. No.: 15/104,583

(22) PCT Filed: Nov. 14, 2014

(86) PCT No.: PCT/EP2014/074588
§ 371 (c)(1),
(2) Date: Jun. 15, 2016

(87) PCT Pub. No.: WO2015/090754
PCT Pub. Date: Jun. 25, 2015

(65) Prior Publication Data
US 2016/0322927 A1    Nov. 3, 2016

(30) Foreign Application Priority Data
Dec. 19, 2013   (DE) ................ 10 2013 226 564

(51) Int. Cl.
*H02K 29/12*   (2006.01)
*H02P 29/024*   (2016.01)
(Continued)

(52) U.S. Cl.
CPC ............ *H02P 29/0241* (2016.02); *B60L 3/04* (2013.01); *H02P 3/18* (2013.01); *H02P 23/0027* (2013.01); *H02P 27/06* (2013.01); *Y02T 10/642* (2013.01)

(58) Field of Classification Search
CPC .......... H02K 29/08; H02K 29/10; H02P 6/06; H02P 6/14; B60W 10/08; G05B 11/28; G05B 2219/42237
(Continued)

(56) References Cited

U.S. PATENT DOCUMENTS 5,731,669 A * 3/1998 Shimizu .............. B60L 11/1807
318/139
5,874,818 A * 2/1999 Schuurman ....... H02M 7/53873
318/280

(Continued)

FOREIGN PATENT DOCUMENTS

DE    102007020509    11/2008
DE    102012002023    12/2012
DE    102012101508    8/2013

OTHER PUBLICATIONS
International Search Report for Application No. PCT/EP2014/074588 dated Feb. 9, 2015 (English Translation, 2 pages).

*Primary Examiner* — Rina Duda
(74) *Attorney, Agent, or Firm* — Michael Best & Friedrich LLP (57) ABSTRACT

The present invention provides a method and a device for operating an electric machine for a soft changeover from a normal or free-wheel mode to an active short-circuit. To this end, a voltage with which the electric machine is actuated is first reduced in a defined manner to a predefined, preferably very low value and then the phase connections of the electric machine are short-circuited. Excessively high overcurrents, particularly overcurrents greater than the nominal current of the electric machine, can thus be avoided.

11 Claims, 4 Drawing Sheets

(51) Int. Cl.
*B60L 3/04* (2006.01)
*H02P 3/18* (2006.01)
*H02P 23/00* (2016.01)
*H02P 27/06* (2006.01)

(58) Field of Classification Search
USPC .............. 318/139, 599, 811, 400.37–400.4
See application file for complete search history.

(56) References Cited

U.S. PATENT DOCUMENTS

| | | | |
|---|---|---|---|
| 6,850,424 B2 * | 2/2005 | Baudelot | H02M 5/4585 |
| | | | 363/37 |
| 7,279,862 B1 | 10/2007 | Welchko et al. | |
| 7,489,097 B2 * | 2/2009 | Fu | B60K 6/26 |
| | | | 318/400.01 |
| 7,498,761 B2 * | 3/2009 | Iwashita | H02P 29/032 |
| | | | 318/609 |
| 8,319,460 B2 * | 11/2012 | Son | H02P 6/20 |
| | | | 318/254.1 |
| 2005/0248306 A1 * | 11/2005 | Chen | H02P 25/03 |
| | | | 318/712 |
| 2010/0202089 A1 * | 8/2010 | Kuehner | B60L 3/0023 |
| | | | 361/30 |
| 2011/0095713 A1 * | 4/2011 | Son | H02P 6/20 |
| | | | 318/400.11 |

* cited by examiner

DEVICE AND METHOD FOR OPERATING AN ELECTRIC MACHINE

BACKGROUND OF THE INVENTION

The present invention relates to a device and a method for operating an electric machine. The present invention particularly relates to a device and a method for operating an electric machine during a transition of the electric machine to an active short-circuit mode.

Electric machines, such as, for example, permanently excited synchronous machines, are used for numerous technical applications. Electric machines can, for example, be used as a drive for an entirely or partially electrically operated motor vehicle. For safety reasons, provisions must thereby be made for dealing with a possible fault. Such a fault can, for example, be a disturbance or breakdown of a sensor which delivers measured values for a reliable operation of the electric machine. A further fault can, for example, be the breakdown of a supply voltage in an electrically operated motor vehicle. An option for an operating mode in the event of a fault is a free-wheel mode of the electric machine. In so doing, an electric voltage is no longer applied to the electric machine from the outside. The electrical phase connections of the machine are isolated from one another in the process. A further safe operating mode is the so-called active short-circuit. In the case of this active short-circuit, all phase connections of the machine are electrically connected to one another by means of suitable switching elements.

The German patent specification DE 10 2012 101 508 A1 discloses a method and a device which initially operate an electric machine in such an active short-circuit when a loss of a supply voltage occurs. In this case, current rectifier valves in the intermediate circuit of an actuating circuit for the electric machine are closed, and therefore the connections of the electric machine are short-circuited.

A need exists for a device and a method for operating an electric machine, which allow an active short-circuit operation to be introduced in the electric machine in a safe and component-protecting manner.

SUMMARY OF THE INVENTION

To this end, the present invention provides a device for operating an electric machine, comprising an inverter which is designed to provide an AC voltage at the connections of the electric machine in a controlled mode and to electrically connect the connections of the electric machine to one another in a short-circuit mode, wherein the inverter is further designed to set the amplitude of the AC voltage provided at the connections of the electric machine to a predefined value.

In a further aspect, the present invention provides a method for operating an electric machine, comprising the following steps: actuating the connections of the electric machine with an AC voltage; setting the amplitude of the AC voltage with which the electric machine is actuated to a predetermined value; and electrically connecting the connections of the electric machine after the amplitude of the AC voltage has been set to a predetermined value.

The concept underlying the present invention is that the electrical voltage at the phase connections of an electric machine is first reduced in a controlled manner to a suitable voltage level before the electric machine is switched to an active short-circuit. Hence, the transition from a current operating mode of the electric machine to an active short-circuit does not take place abruptly but under controlled framework conditions. It is possible by means of this controlled transition of the electrical voltage at the phase connections of the electric machine prior to an active short-circuit for the machine to be transferred to the active short-circuit without an additional overcurrent ensuing thereby.

This reduction in the maximum voltage during the transition to the active short-circuit allows the actuating circuit as well as the electric machine itself to accordingly be dimensioned in a more efficient manner. In addition, the service life of the actuating circuit and the electric machine is also increased by reducing the currents that maximally occur and thus the availability of the entire system is increased. In particular, the risk that a demagnetization of the magnets in the rotor of the electric machine occurs as a result of too high overcurrents during the changeover to an active short-circuit in said electric machine can be reduced. The mechanical load within the electric machine and particularly in the windings of the electric machine also drops during an inventive transition to the active short-circuit.

According to one embodiment of the invention, the inverter is designed to reduce the amplitude of the AC voltage provided at the connections of the electric machine to 0 volts prior to a transition from the controlled mode to the short-circuit mode. The voltage at the phase connections of the electric machine can alternatively be reduced to a value of approximately 0 volts or at least to a value which is smaller than the voltage at the connections of the electric machine during the controlled operation. Such a reduction of the electric voltage at the phase connections of the electric machine prior to the transition to the active short-circuit can ensure that dangerous overcurrents do not occur which would lead to damage or a premature ageing of the components used.

According to one embodiment of the invention, the inverter is designed to electrically isolate the connections of the electric machine from one another in a free-wheel mode; and the inverter is further designed to first provide an AC voltage at the connections of the electric machine during a transition from the free-wheel mode to the short-circuit mode. In the free-wheel mode, the electric machine is not initially actively actuated. If a changeover is made from the free-wheel mode to the active short-circuit, the electric machine can therefore initially be actuated with an electrical voltage which at least approximately corresponds to the free-wheel voltage applied to the connections of the electric machine in order to avoid excessively high overcurrents. This voltage with which the electric machine is then actuated can subsequently be actively lowered to the predetermined value, which is required for a gentle changeover to an active short-circuit. In this way, a gentle changeover from the free-wheel mode to the active short-circuit is also possible without dangerous overcurrents occurring in the process.

According to one exemplary embodiment, the device further comprises a rotational speed sensor, which is designed to determine the rotational speed of the electric machine, wherein the inverter initially determines a free-wheel voltage that is dependent on the rotational speed during a transition from the free-wheel mode to the short-circuit mode; and the determined free-wheel voltage that is dependent on the rotational speed is provided at the connections of the electric machine. Because the free-wheel voltage generally represents a function that is dependent on the rotational speed of the electric machine, an efficient determination of the free-wheel voltage at the electric machine can also be ensured in this case so that no larger discrepancies between the voltage provided by the inverter and the actual free-wheel voltage occur when actuating the electric machine.

The device for operating the electric machine can also additionally or alternatively have a voltage sensor at its disposal which detects the electrical voltage at the connections of the machine, wherein said sensor initially sets the free-wheel voltage detected by the sensor during a transition from the free-wheel mode to the short-circuit mode. On the basis of this voltage, the actuation can then subsequently be adapted to the voltage required for the changeover to the active short-circuit.

According to one exemplary embodiment of the invention, the inverter is designed to set the amplitude of the AC voltage within a predetermined period of time to a predetermined value upon completion of the controlled operation. In this way, the time period within which the transition from the controlled operation to the short-circuit mode takes place can be predefined. It is thus also ensured that an excessive delay during activation of the active short-circuit does not occur.

It is also alternatively possible that the inverter, during a transition from the controlled mode to the short-circuit mode, sets the amplitude of the AC voltage provided at the connections of the electric machine so as to have a predetermined slope, i.e. so as to have a predetermined voltage difference per unit of time. In this way, it can be ensured that excessively high changes in the voltage ratios do not occur.

The present invention further relates to an electric drive device comprising an electric machine and an inventive device for operating an electric machine.

According to one exemplary embodiment of the invention, the electric machine thereby comprises a permanently excited synchronous machine.

The present invention further relates to a motor vehicle comprising an electric machine, which is actuated by an inventive device for operating the electric machine.

According to one exemplary embodiment of the invention, the method for operating the electric machine further comprises the following steps: operating an electric machine in a free-wheel mode, wherein the connections of the electric machine are electrically isolated from one another; ascertaining a free-wheel voltage, which corresponds to the voltage at the connections of the electric machine in the free-wheel mode; and actuating the connections of the electric machine with the ascertained free-wheel voltage.

BRIEF DESCRIPTION OF THE DRAWINGS

Further embodiments and advantages of the present invention ensure from the following description with reference to the attached drawings.

In the drawings.

DETAILED DESCRIPTION

Figure 1:
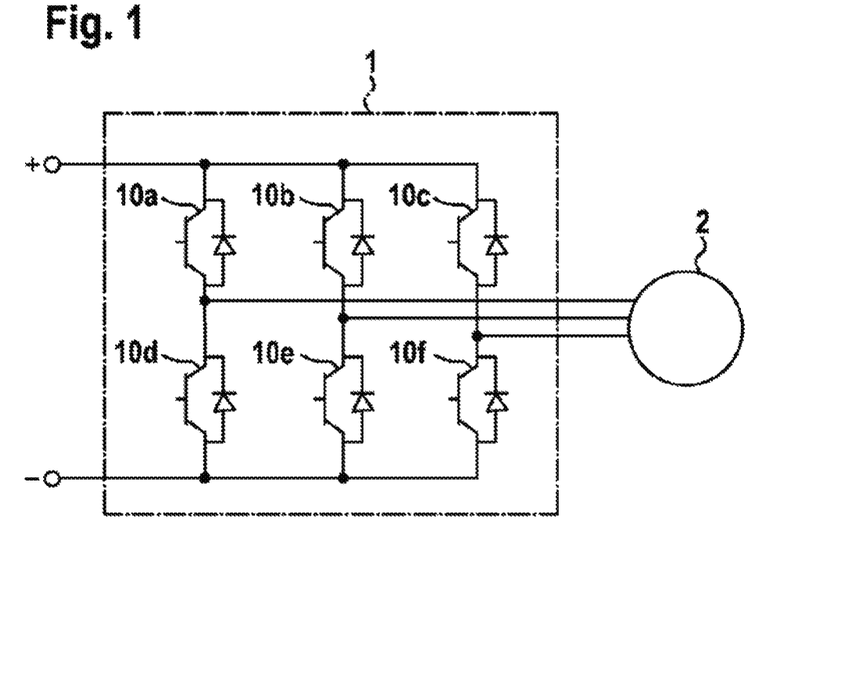
FIG. 1 shows a schematic depiction of an electric drive device.

FIG. 1 shows a schematic depiction of an electric drive system as said system forms the basis of the present invention. The electric drive system comprises an electric machine 2 and an inverter 1. The inverter 1 is fed with electrical energy, preferably with a DC voltage. The DC voltage can, for example, originate from an electrical energy store, such as, e.g., a battery. Said electrical energy store can, for example, relate to a traction battery of an electric or hybrid vehicle. Alternative options for providing an electrical voltage are also possible. The electrical energy can, for example, be drawn from an AC voltage network and be converted to a DC voltage by means of an AC-DC converter.

In a controlled mode, the inverter 1 converts the electrical energy provided at the input into a suitable AC voltage and provides the same at the phase connections of the electric machine 2. In a normal mode, the electrical AC voltage provided can be set at the connections of the electric machine 2 such that a desired rotational speed or a desired torque is achieved by the electric machine 2. To this end, the electric drive system can also further have one or a plurality of sensors (not depicted) available, which, for example, ascertain the current rotational speed, voltage ratios or phase currents within the electric drive system. These sensor values can then be evaluated by a control system and subsequently the actuation of the inverter can be adjusted on the basis of the predefined target values.

In the exemplary embodiments described here, the electric machine 2 relates to a three-phase electric motor. In addition, electric machines comprising another number of phase connections are also possible. The electric machine 2 can, for example, relate to a synchronous machine, preferably a permanently excited synchronous machine. Other electric machines are, however, furthermore possible, such as, for example, an asynchronous machine, etc.

The inverter 1 comprises in this case a plurality of switching elements 10*a*-10*f*. By suitably actuating these switching elements 10*a*-10*f*, the inverter 1 can thus convert an AC voltage from the voltage provided at the input, said AC voltage being provided at the connections of the electric machine 2. In accordance with the actuation of the individual switching elements 10*a*-10*f*, an AC voltage having a predefined amplitude can be generated by a suitable pulsing of these switching elements. In so doing, the amplitude of the AC voltage generated in this manner can be adapted as a function of a torque to be achieved or, respectively to a rotational speed of the electric machine 2 to be achieved.

The switching elements 10*a*-10*f* preferably relate to semiconductor switching elements, such as, for example, IGBTs or MOSFETs. A freewheel diode can furthermore be connected in parallel to each of these switching elements 10*a*-10*f*. When the semiconductor switch is open, a current driven by the electric machine 2 can, if applicable, flow through this freewheel diode.

Figure 2:
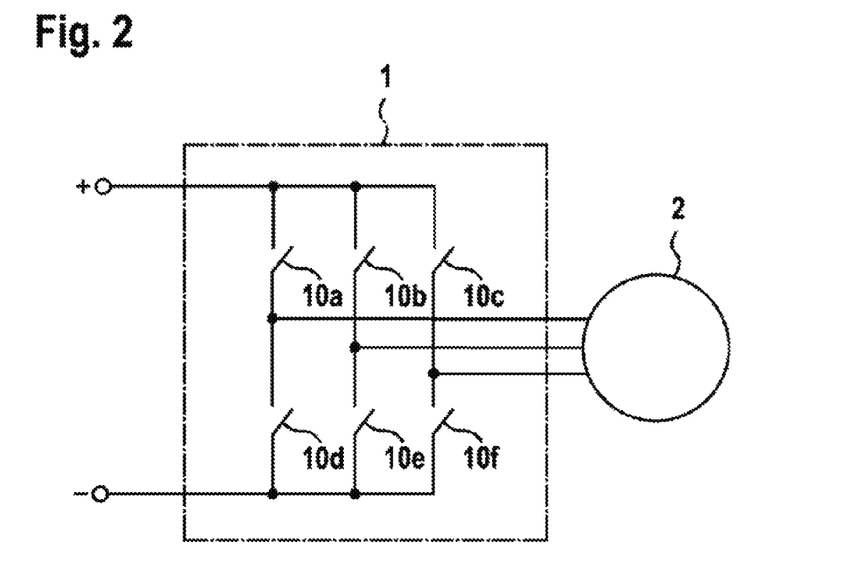
FIG. 2 shows a schematic depiction of an electric drive device in the free-wheel mode.

FIG. 2 shows a schematic depiction of an electric drive system in the free-wheel mode. The switching elements 10*a*-10*f* are only depicted as simple switches for the purpose of clarity. Analogous to FIG. 1, each of the switching elements 10*a*-10*f* can relate to a semiconductor switch having a freewheel diode connected in parallel thereto. The switching elements depicted in FIG. 2 each depict the state of the corresponding switching elements 10*a*-10*f*. In the free-wheel mode depicted here, all of the switching elements 10a-10f are open. Hence, no voltage is provided at the electric machine 2. Only the free-wheel voltage generated by the electric machine 2 in the generator mode is therefore applied to the terminals of the electric machine. If need be, a current can thereby flow across the free-wheel diodes that are connected in parallel to the switching elements 10a-10f.

Figure 3:
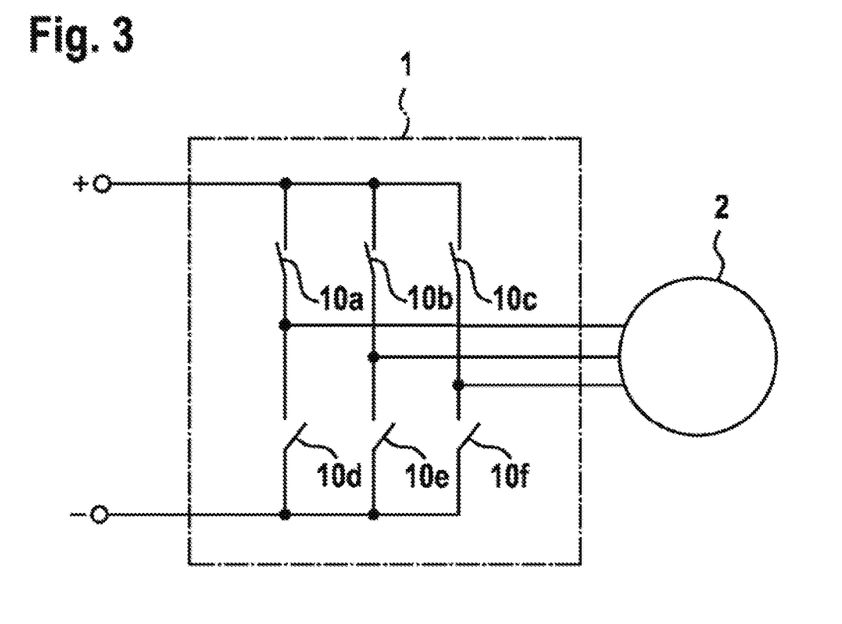
FIG. 3 shows a schematic depiction of an electric drive device in an active short-circuit mode according to one embodiment.

FIG. 3 shows a schematic depiction of an actuation of the electric machine 2 in an active short-circuit according to a first exemplary embodiment. In this exemplary embodiment, the upper three switching elements 10a, 10b and 10c are closed. Hence, the phase connections of the electric machine 2 are electrically connected to one another via these three switching elements 10a-10c, i.e. short-circuited.

Figure 4:
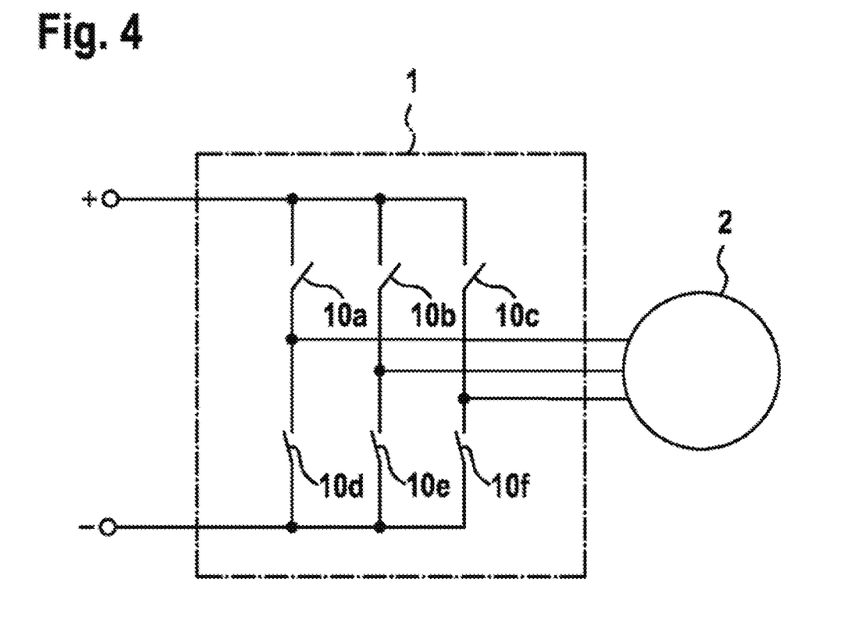
FIG. 4 shows a schematic depiction of an electric drive device in an active short-circuit mode according to a further embodiment.

FIG. 4 shows an alternative schematic depiction for an active short-circuit according to a further exemplary embodiment. In so doing, the lower switching elements 10d, 10e and 10f are closed in this exemplary embodiment, whereas the upper three switching elements 10a-10c are open. In this exemplary embodiment, the phase connections of the electric machine 2 are electrically connected to one another via the lower three switching elements 10d-10f and therefore short-circuited.

Figure 5:
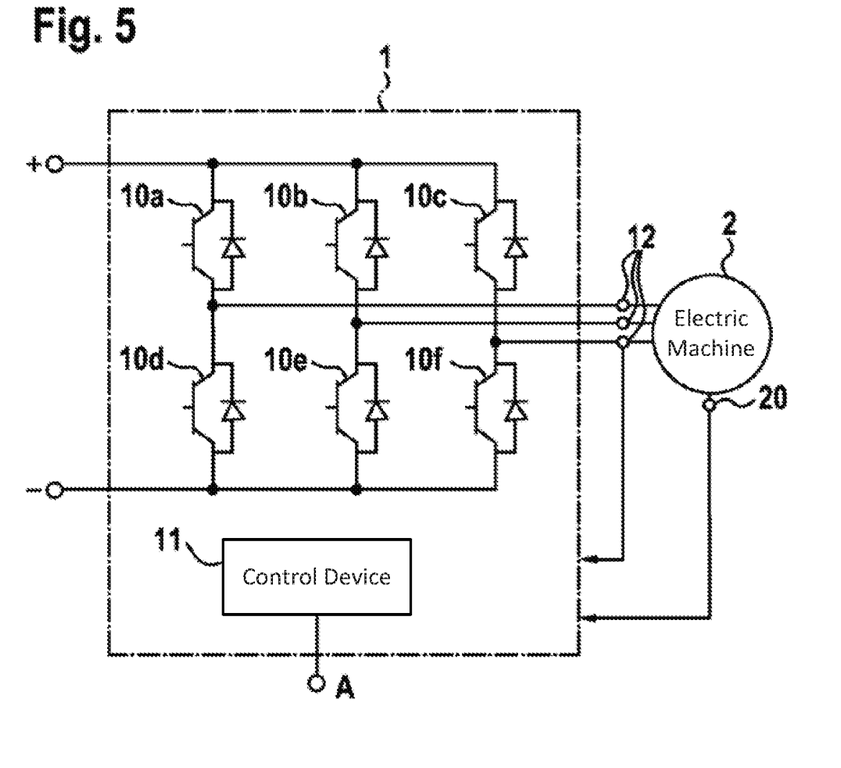
FIG. 5 shows a schematic depiction of an electric drive system according to a further embodiment of the present invention.

FIG. 5 shows a schematic depiction of an electric drive device according to one embodiment of the present invention. The electric drive device comprises an electric machine 2. In this case, the electric machine can relate to one of the already mentioned electric machines, such as, for example, a synchronous machine, for example a permanently excited synchronous machine, or also alternatively to an asynchronous machine or something similar. In this exemplary embodiment as well, the three phase connections are only shown by way of example for the connection of the electric machine 2 to the inverter 1. Furthermore, any other number of phase connections is also possible.

The electric machine 2 is, as previously described, actuated by an inverter 1. In a normal mode, the inverter 1 provides in each case a suitable AC voltage signal at the phase connections of the electric machine. In this way, it is possible to operate the electric machine 2 at a predefined rotational speed or with a predefined torque.

If a fault occurs during the operation of the electric drive, it may be necessary to short-circuit the phase connections of the electric machine 2 among themselves. To this end, the electric machine 2 can be set into the active short-circuit by the inverter 1 in accordance with FIG. 3 or FIG. 4; and a safer and more reliable condition of the electric machine 2 can be achieved.

If such a fault is detected by a control device 11 of the inverter 1 or also via an external checking and/or control device (not depicted here), said fault requiring an active short-circuit, the phase connections of the electric machine 2 are directly and immediately connected to one another. As soon as the control device 11 of the inverter 1 detects a fault or receives a request for an active short-circuit via a further connection A, the voltage at the phase connections of the electric machine 2 is initially continually adjusted to a value which enables a changeover to the active short-circuit without overcurrents occurring in the process. For example, this can relate to a previously defined voltage value, i.e. to an AC voltage having a predetermined amplitude, to which the voltages at the phase connections of the electric machine 2 are initially adjusted. As a rule, the voltage applied to the phase connections of the electric machine 2 at the point in time of the request for an active short-circuit is continually lowered to a smaller voltage value.

Because the phase connections of the electric machine 2 are short-circuited during an active short-circuit of the electric machine 2, the voltage is preferably reduced from a current value to 0 volts when lowering the voltage at the phase connections of the electric machine 2. It is, however, also possible not to reduce the voltage at the phase connections of the electric machine 2 completely to 0 volts, but to lower the phase voltages only to a predetermined value and subsequently to short-circuit the phase connections among themselves by means of the inverter 1.

The amplitude of the AC voltage, which is applied at the beginning of the request for an active short-circuit at the phase connections of the electric machine 2, can thereby be adjusted within a predetermined time interval to a predetermined value, which is required for a changeover to an active short-circuit. This time interval can, for example, relate to a time interval of a few milliseconds, for example 20 milliseconds, 10 milliseconds, 5 milliseconds or even only 1 millisecond. In this way, it can be ensured that the active short-circuit can actually be implemented even within a short period of time and that no large delays occur for adjusting to a safe and reliable condition, in particular in the event of a fault.

The changeover can alternatively be carried out, even with a predetermined maximum slope, from the current phase voltage at the connections of the electric machine 2 to the value for the changeover to the active state. That means the amplitude of the voltage applied to the phase connections of the electric machine 2 is changed per unit of time maximally by a predetermined value. In this way, it can be ensured that no excessively large voltage jumps occur when actuating the electric machine 2.

The change in the voltage ratios at the phase connections of the electric machine 2 preferably occurs linearly, i.e. the amplitude of the voltage at the phase connections is carried out over the entire period of time so as to have a constant change in voltage per unit of time. Alternative variations are, however, also possible for setting the predetermined voltage for the changeover to the short-circuit.

If, during the transition to the active short-circuit, the voltages at the phase connections of the electric machine 2 are carried out via the manipulated variables of a D-Q control system, the components of the two voltages $U_d(t)$ and $U_q(t)$ can be controlled in the following manner:

$$U_d(t) = \frac{U_{d,init}}{\Delta t}(t - \Delta t);$$

$$U_q(t) = \frac{U_{q,init}}{\Delta t}(t - \Delta t);$$

In this case, $U_{d,init}$ and $U_{q,init}$ are in each case the two initial voltage values at the beginning of the request for an active short-circuit and $\Delta t$ is the period of time in which the changeover to the short-circuit is to occur.

In this case, the voltages are lowered at the phase connections of the electric machine 2 from the initial values at the beginning of the request for an active short-circuit to 0 volts during a changeover to the active short-circuit without the phase currents having to be measured for this purpose.

It is, however, also alternatively possible, if available, to allow sensor values about the current state of the electric drive device, such as, for example, the phase currents or the current voltage ratios at the electric machine 2 to flow into the control process.

During the previously described transition from a normal mode, in which the electric machine is actively supplied with voltages by the inverter 1, to the active short-circuit, it is furthermore possible to transfer the electric machine from the free-wheel mode likewise to the active short circuit without dangerous overcurrents occurring in the process. If the electric drive is situated in the free-wheel mode, i.e. all of the switching elements 10a-10f of the inverter 1 are open and the electric phase connections are electrically isolated from one another, an electrical AC voltage appears at each of these phase connections, said AC voltage not being influenced by the inverter 1 at this point in time.

If a changeover is to be made from this free-wheel mode to the active short-circuit, the electric machine 2 has to first be actively actuated by the inverter 1. During this actuation of the electric machine 2 by the inverter 1, the voltage at the phase connections of the electric machine 2 can be lowered to a predetermined value, for example 0 volts, as previously described. In order not to cause any voltage jumps at the beginning of this active actuation, the electric machine 2 is initially actuated with a voltage that corresponds to the free-wheel voltage of the electric machine 2 when a changeover is made from the free-wheel mode to the controlled mode. To this end, the electric drive device can, for example, comprise a voltage sensor 12, which measures the voltages at the phase connections of the electric machine 2. The voltage values measured in this manner are provided to the controller 11 of the inverter 1, whereupon the inverter 1 provides an AC voltage at the phase connections of the electric machine 2, which corresponds to these voltage values.

It is also alternatively possible to acquire the current rotational speed of the electric machine 2 by means of a rotational speed sensor 20 and to determine the current free-wheel voltage of the electric machine 2 from said current rotational speed. The relationships between rotational speed and corresponding free-wheel voltage of the electric machine can, for example, be deposited in a memory. After determining the current rotational speed of the electric machine 2, the corresponding free-wheel voltage can thus be read out from this memory and be set at the connections of the electric machine. It is also alternatively possible to define a mathematical relationship between free-wheel voltage and rotational speed and to determine the free-wheel voltage from the acquired rotational speed of the electric machine. Further options for determining or calculating the free-wheel voltage are also possible. In addition to a measurement of the current rotational speed of the electric machine 2 using sensors, it is also possible to determine the rotational speed on the basis of a model or to determine estimated values or the rotational speed that was last actively adjusted. Further options for determining the rotational speed of the electric machine 2 in the free-wheel mode are likewise possible.

After the free-wheel voltage has initially been set at the phase connections of the electric machine 2 by the inverter 1, the AC voltage provided by the inverter 1 at the phase connections of the electric machine 2 is subsequently continuously lowered to a predetermined value. If this predetermined value is achieved, the inverter 1 then switches thereupon to the active short-circuit, for example in accordance with FIG. 3 or 4.

Figure 6:
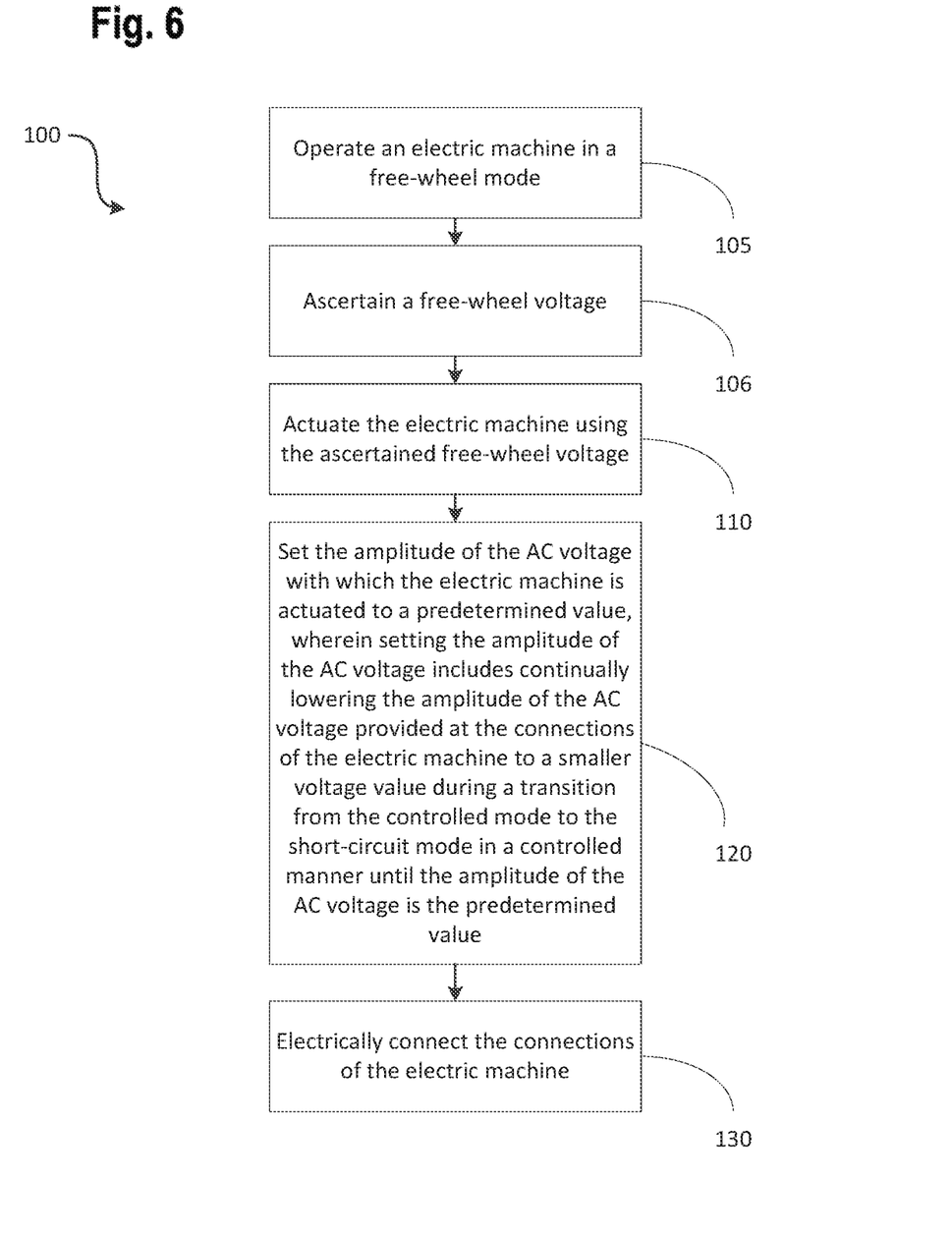
FIG. 6 shows a schematic depiction of a flow diagram for a method as it forms the basis for a further exemplary embodiment.

FIG. 6 shows a schematic depiction of a flow diagram, as said diagram underlies a method 100 for operating an electric machine 2. In a normal mode, in which the electric machine 2 is to be operated at a predefined rotational speed or with a predefined torque, the electric machine 2 is actuated with a corresponding AC voltage. If an electric machine 2 actuated in this manner is to change over to the active short-circuit, the amplitude of the AC voltage at the connections of the electric machine are thus set to a predetermined value after a corresponding event has occurred, for example the detection of a fault or a direct request for the active short-circuit. This setting of the AC voltage to a predetermined value takes place starting from the voltage with which the electric machine is actuated in the normal mode to the predetermined value within a predetermined period of time or with a predetermined slope. After the predetermined value of the AC voltage has been set at the connections of the electric machine, the connections of the electric machine are electrically connected to one another in step 130 and are consequently short-circuited.

If the electric machine is operated in a free-wheel mode in step 105, in which the connections of the electric machine are electrically isolated from one another, it is thereby initially required to actuate the electric machine in a defined manner. To this end, a free-wheel voltage is ascertained in step 106, which corresponds to the voltage at the connections of the electric machine. The electric machine is subsequently actuated using the ascertained free-wheel voltage in step 110 which was previously described.

In summary, the present invention relates to a method and a device for operating an electric machine for a soft changeover from a normal or free-wheel mode to the active short-circuit. To this end, a voltage with which the electric machine is actuated is first reduced in a defined manner to a predefined, preferably very low, value and then the phase connections of the electric machine are short-circuited. Excessively high overcurrents, particularly overcurrents greater than the nominal current of the electric machine, can thus be avoided.

The invention claimed is:

1. A device for operating an electric machine (2), comprising
    an inverter (1), which is designed to provide an AC voltage at the connections of the electric machine (2) in a controlled mode and to connect the connections of the electric machine (2) electrically to each other in a short-circuit mode,
    wherein the inverter (1) is designed to set the amplitude of the AC voltage provided at the connections of the electric machine (2) to a predetermined value during a transition from the controlled mode to the short-circuit mode,
    wherein the amplitude of the AC voltage provided at the connections of the electric machine is continually lowered to a smaller voltage value during the transition from the controlled mode to the short-circuit mode in a controlled manner until the amplitude of the AC voltage is the predetermined value.

2. The device according to claim 1, wherein the inverter (1) is designed to lower the amplitude of the AC voltage provided at the connections of the electric machine (2) to 0 volts prior to a transition from the controlled mode to the short-circuit mode.

3. The device according to claim 1, wherein the inverter (1) is designed to isolate the connections of the electric machine (2) from one another in a free-wheel mode, and wherein the inverter (1) is designed to initially provide an AC voltage at the connections during a transition from the free-wheel mode to the short-circuit mode.

4. The device according to claim 3, comprising a rotational speed sensor (20), which is designed to determine the rotational speed of the electric machine (2), and wherein the inverter (1) initially ascertains a free-wheel voltage that is dependent on the rotational speed during a transition from the free-wheel mode to the short-circuit mode and provides the ascertained free-wheel voltage that is dependent on the rotational speed at the connections of the electric machine (2).

5. The device according to claim 1, wherein the inverter (1) is designed to set the amplitude of the AC voltage within a predetermined period of time to the predetermined value upon completion of the controlled operation.

6. An electric drive device, comprising:
an electric machine (2); and
a device according to claim 1.

7. The electric drive device according to claim 6, wherein the electric machine (2) comprises a permanently exited synchronous machine.

8. The device according to claim 1, wherein the inverter sets the amplitude of the AC voltage provided at the connections of the electric machine by adjusting the amplitude of the AC voltage by a predefined voltage difference per unit of time during the transition from the controlled mode to the short-circuit mode.

9. The device according to claim 1, wherein the inverter sets the amplitude of the AC voltage provided at the connections of the electric machine by constantly changing the amplitude of the AC voltage during the transition from the controlled mode to the short-circuit mode over an entire period of time of the transition.

10. A method (100) for operating an electric machine (2), comprising the following steps:

actuating (110) connections of the electric machine (2) with an AC voltage, wherein the connections of the electric machine are actuated with the AC voltage during a controlled mode;

setting (120) an amplitude of the AC voltage with which the electric machine (2) is actuated to a predetermined value; and electrically connecting (130) the connections of the electric machine (2) after the amplitude of the AC voltage has been set to a predetermined value, wherein the connections of the electric machine are electrically connected during a short-circuit mode, wherein setting the amplitude of the AC voltage includes continually lowering the amplitude of the AC voltage provided at the connections of the electric machine to a smaller voltage value during a transition from the controlled mode the controlled mode to the short-circuit mode in a controlled manner until the amplitude of the AC voltage is the predetermined value.

11. The method according to claim 10, comprising the following steps:

operating (105) an electric machine (2) in a free-wheel mode, wherein the connections of the electric machine (2) are electrically isolated from one another; and ascertaining (106) a free-wheel voltage, which corresponds to the voltage at the connections of the electric machine (2) in the free-wheel mode;

wherein the step for actuating (110) actuates the connections of the electric machine (2) with the ascertained free-wheel voltage.

\* \* \* \* \*